United States Patent
Baranowski et al.

(10) Patent No.: US 11,505,101 B2
(45) Date of Patent: Nov. 22, 2022

(54) VEHICLE SEAT HAVING AN ADAPTABLE LATERAL SUPPORT AND METHOD FOR ADAPTING THE LATERAL SUPPORT OF A VEHICLE SEAT

(71) Applicant: Ford Global Technologies, LLC, Dearborn, MI (US)

(72) Inventors: Thomas Baranowski, Würselen (DE); Maik Broda, Würselen (DE); Pascal Rebmann, Weilerswist (DE); Markus Franzen, Stolberg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 17/120,419

(22) Filed: Dec. 14, 2020

(65) Prior Publication Data

US 2021/0221269 A1   Jul. 22, 2021

(30) Foreign Application Priority Data

Jan. 17, 2020   (DE) ........................ 102020101028.1

(51) Int. Cl.
| | |
|---|---|
| *B60N 2/20* | (2006.01) |
| *B60N 2/859* | (2018.01) |
| *B60N 2/30* | (2006.01) |
| *B60N 2/36* | (2006.01) |
| *B60N 2/90* | (2018.01) |

(Continued)

(52) U.S. Cl.
CPC ............. *B60N 2/859* (2018.02); *B60N 2/20* (2013.01); *B60N 2/3011* (2013.01); *B60N 2/3065* (2013.01); *B60N 2/36* (2013.01); *B60N 2/62* (2013.01); *B60N 2/6671* (2015.04);

(Continued)

(58) Field of Classification Search
CPC ......... B60N 2/99; B60N 2/6671; B60N 2/667
See application file for complete search history.

(56) References Cited

U.S. PATENT DOCUMENTS 7,137,664 B2   11/2006   McMillen et al.
7,766,425 B2 *  8/2010   Poniatowski .......... B60N 3/102
                                                    297/284.3

(Continued)

FOREIGN PATENT DOCUMENTS

EP     1142751 A1   10/2001
WO  2018017540 A1   1/2018

*Primary Examiner* — Syed A Islam
(74) *Attorney, Agent, or Firm* — Vichit Chea; Price Heneveld LLP

(57) ABSTRACT

A vehicle seat having an adaptable lateral support and method of adapting lateral support are provided. The seat has a seat frame on which a seat cushion and/or a backrest cushion and at least one actuator is retained, wherein the seat cushion and/or the backrest cushion has at least one laterally arranged, resiliently deformable side wall cushion for the lateral support of a person sitting on the vehicle seat and the actuator is operationally connected to the side wall cushion and configured to apply a deformation force for the resilient deformation of the side wall cushion. The vehicle seat has a cable element which connects the side wall cushion to the actuator in a force-transmitting manner so that the actuator introduces the deformation force by tensioning the cable element directly from the cable element into the side wall cushion to deform the side wall cushion to change the lateral support.

20 Claims, 5 Drawing Sheets

(51) Int. Cl.
 *B60N 2/66* (2006.01)
 *B60N 2/75* (2018.01)
 *B60N 2/62* (2006.01)

(52) U.S. Cl.
 CPC ............ *B60N 2/6673* (2015.04); *B60N 2/76* (2018.02); *B60N 2/919* (2018.02); *B60N 2/99* (2018.02)

(56) References Cited

U.S. PATENT DOCUMENTS

| | | |
|---|---|---|
| 8,439,441 B2 | 5/2013 | Ghisoni et al. |
| 8,454,090 B2 | 6/2013 | Colja et al. |
| 8,840,186 B2 * | 9/2014 | Samain .................. F16C 1/101 297/284.3 |
| 10,059,234 B2 * | 8/2018 | Barbat ............... B60N 2/42772 |

* cited by examiner

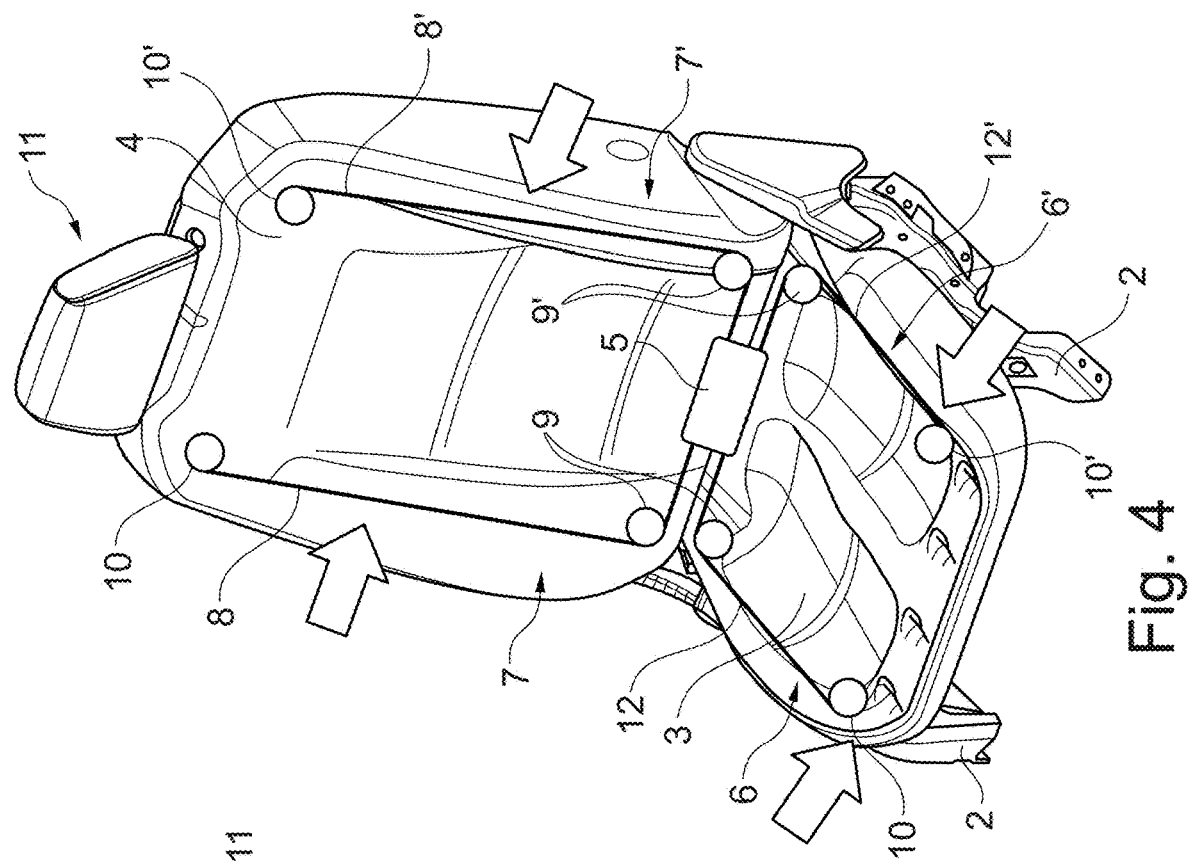
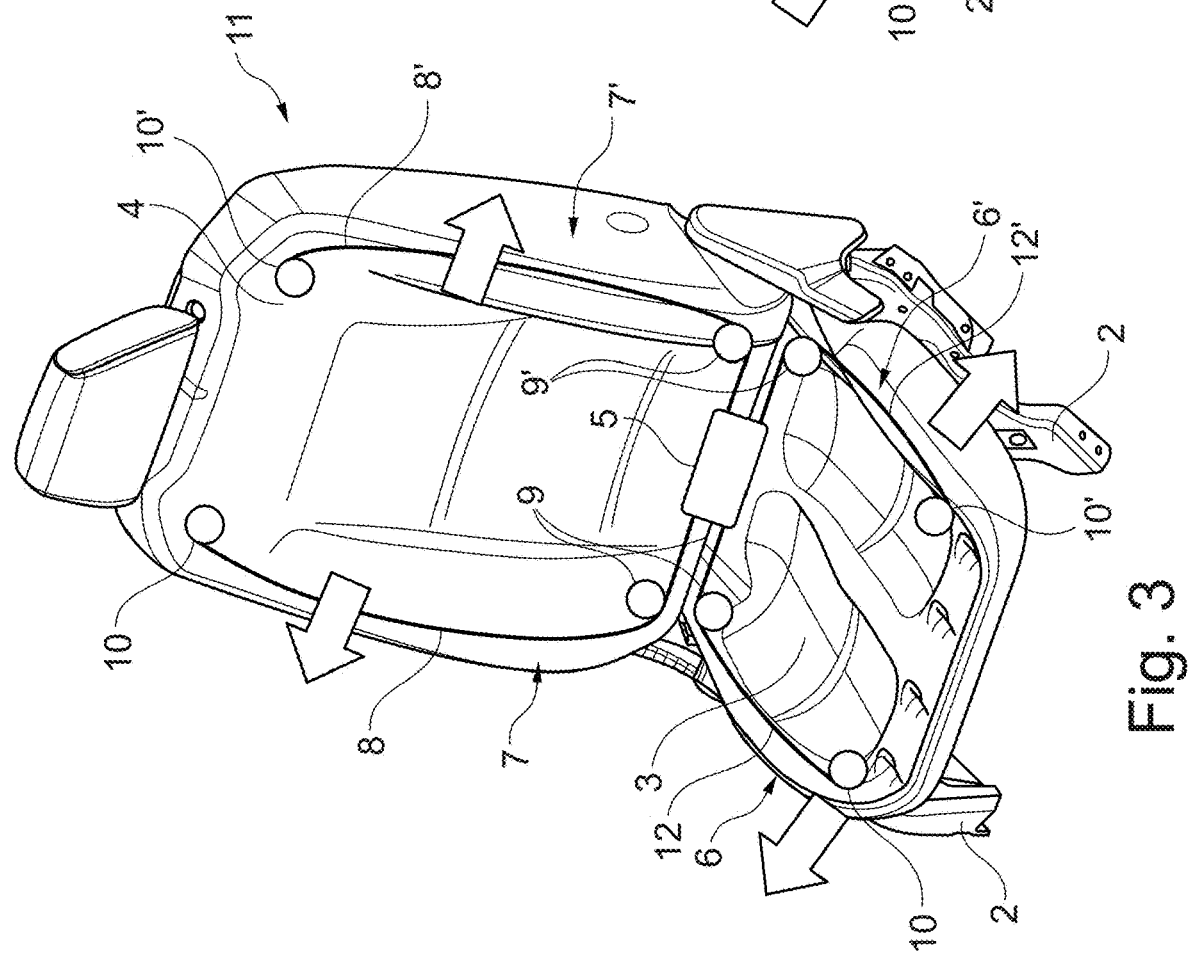

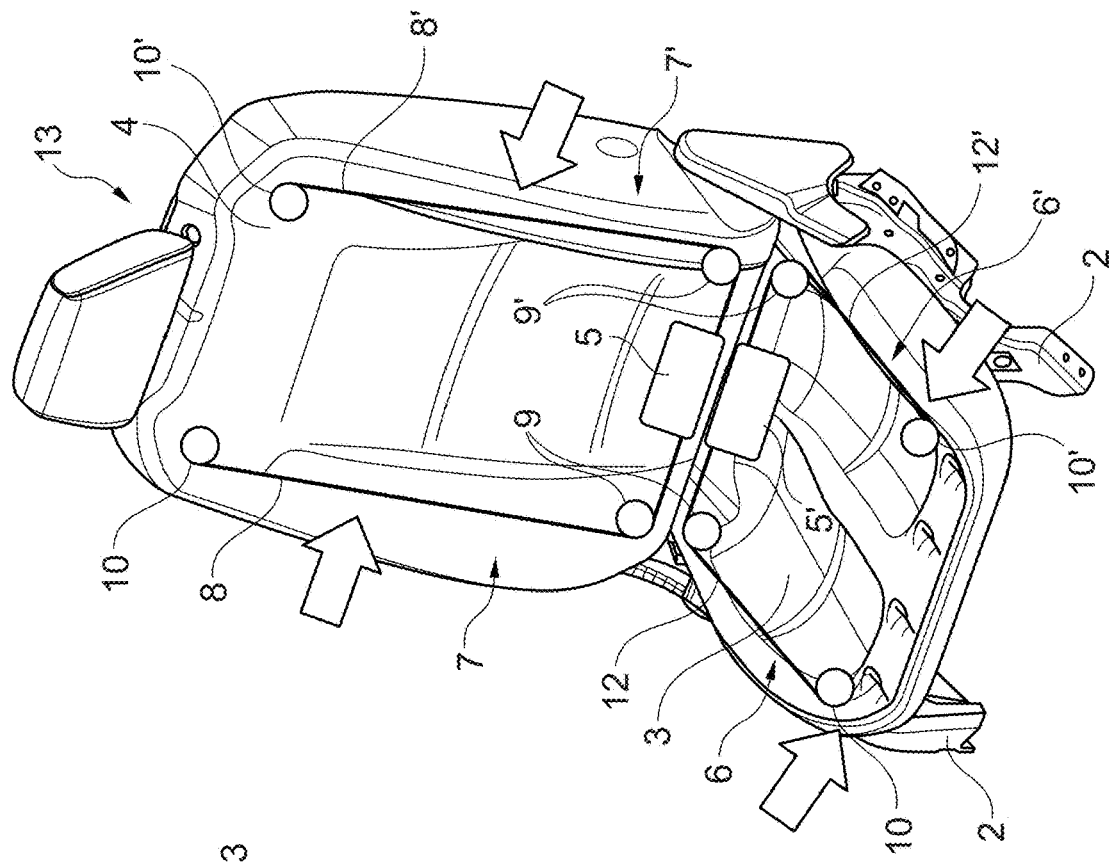
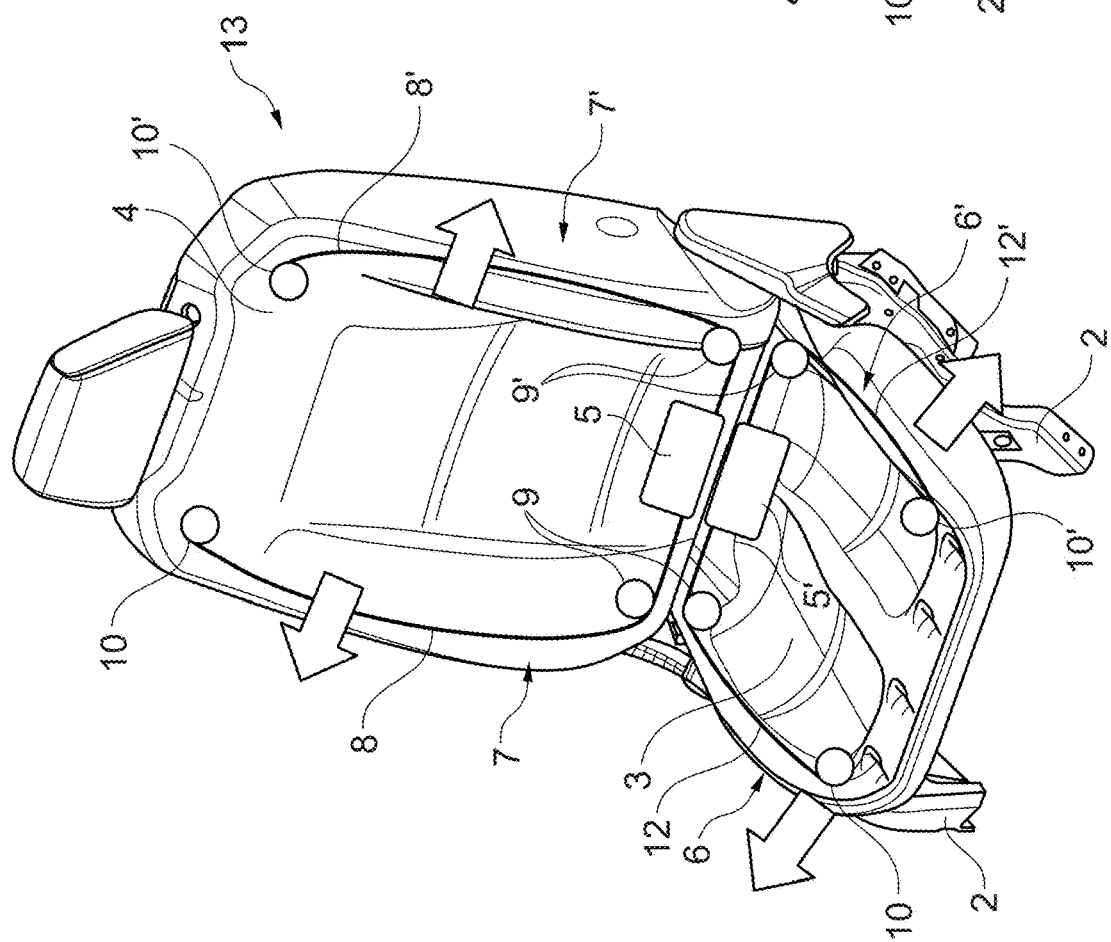

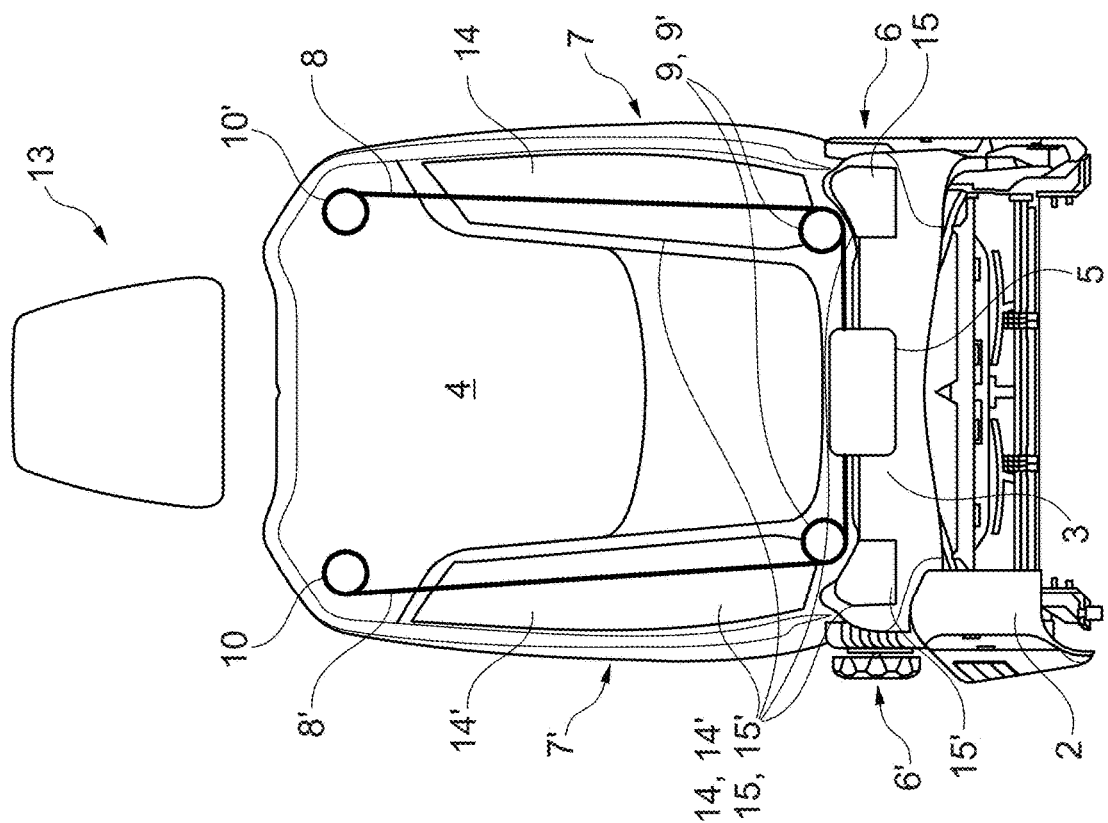
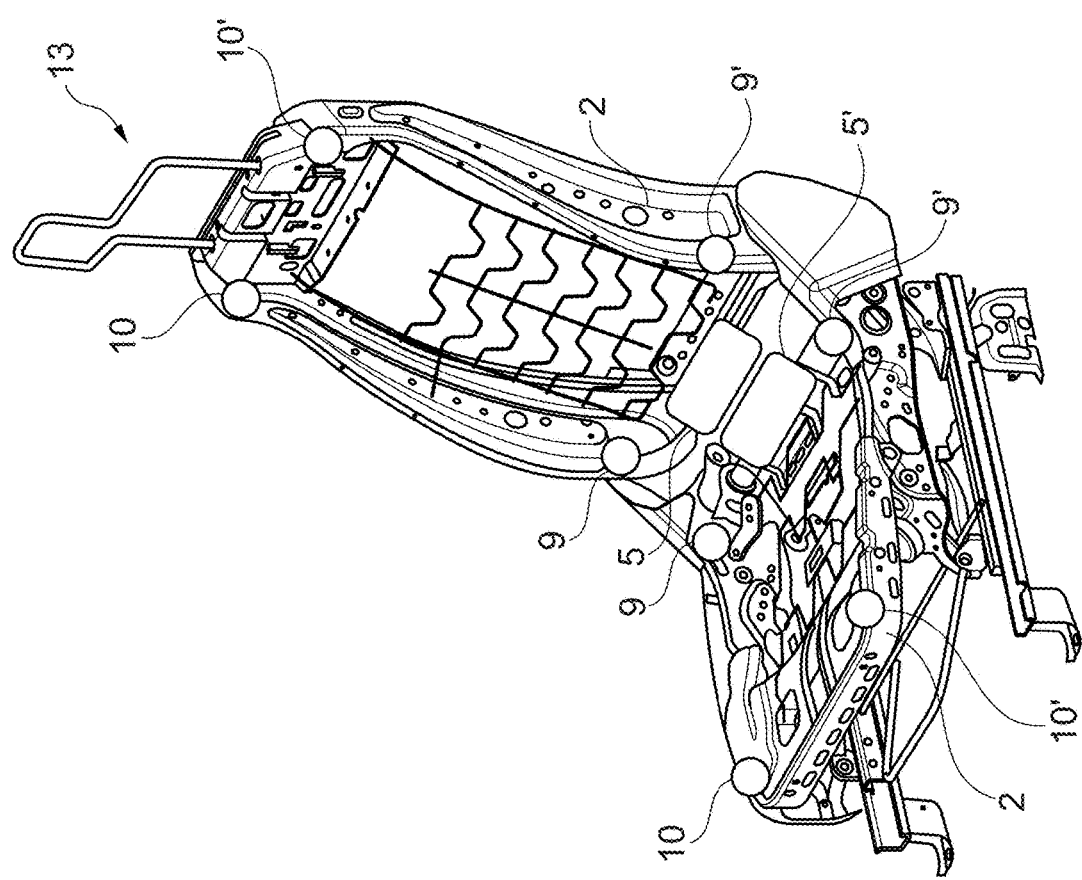

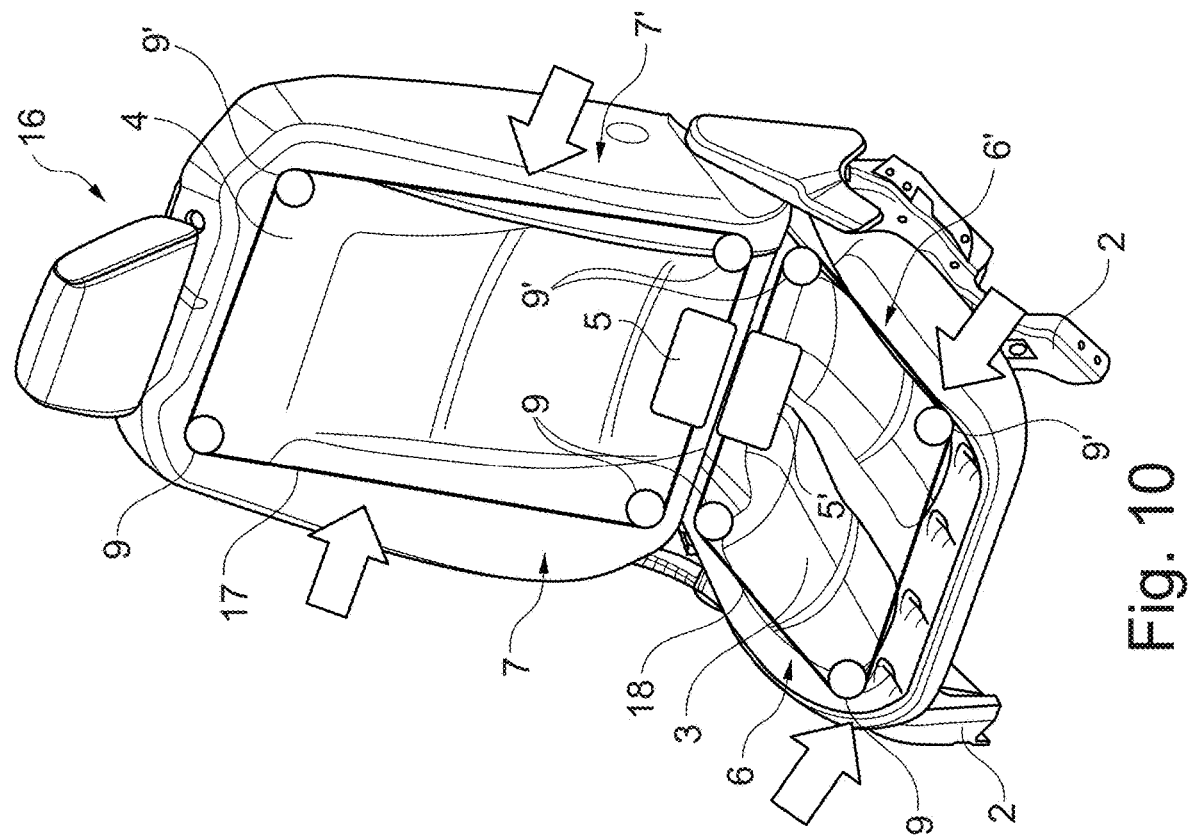
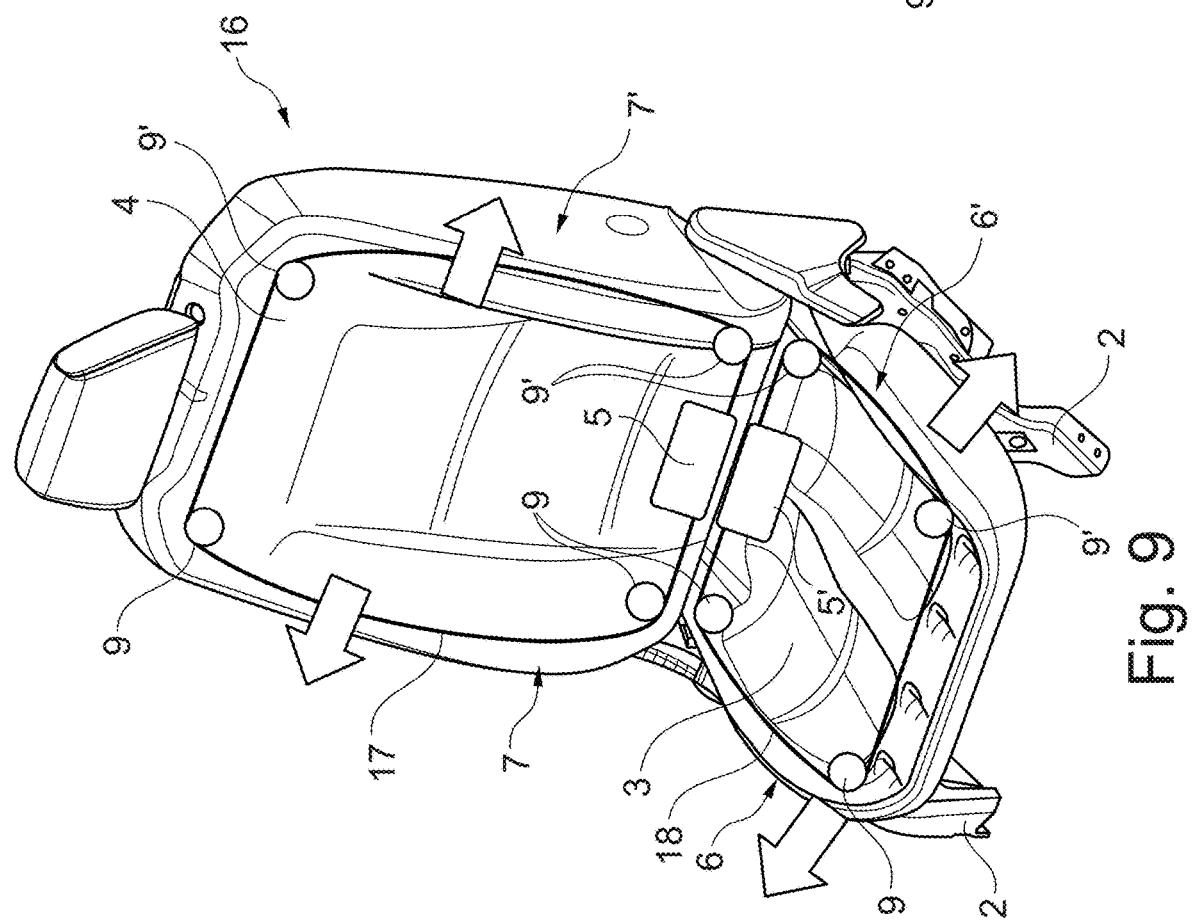

VEHICLE SEAT HAVING AN ADAPTABLE LATERAL SUPPORT AND METHOD FOR ADAPTING THE LATERAL SUPPORT OF A VEHICLE SEAT

CROSS-REFERENCE TO RELATED APPLICATION

This application claims foreign priority benefits under 35 U.S.C. § 119(a)-(d) to German Application No. 102020101028.1, filed Jan. 17, 2020, which is hereby incorporated by reference in its entirety.

FIELD OF THE DISCLOSURE

The present disclosure generally relates to a vehicle seat having an adaptable lateral support and a method for adapting the lateral support of a vehicle seat.

BACKGROUND OF THE DISCLOSURE

Vehicle seats which are used in a motor vehicle (for example, passenger vehicle), typically have a high degree of individual adaptability which is generally expected by a person sitting on the vehicle seat, for example, driver or passenger or other vehicle occupants. As a result of the personal seat adjustment of the vehicle seat, a high level of seat comfort can be achieved. The seat can also be adapted to different travel situations, which may differ in terms of different travel behavior of the vehicle. For example, for vehicle occupants on a (long) motorway journey, comfortable possible seat properties of the vehicle seat are often expected by vehicle occupants. For sporty travel, for example, on (winding) country roads, in contrast a good lateral support of their body in the vehicle seat may be desired by the vehicle occupants, whereby significantly improved body control of the vehicle occupants and improved vehicle control for the driver, is enabled.

The lateral support of a person seated on a vehicle seat can be influenced by seat side walls which are fitted laterally to the vehicle seat and which extend in the seat longitudinal direction. It is known to provide the side walls for a high level of individual adjustability by use of air cushions, in which a different volume of air can be introduced depending on requirements, in order to thereby be able to adapt the lateral support. For example, on motorway journeys, the air volume in the air cushions can be adjusted to be low in order to provide the most comfortable possible seat position with only little lateral support, whereas, in the event of a sporty journey, by inflating the air cushions a particularly powerful lateral support can be provided.

For example, WO 2018/017540 A1 discloses a vehicle seat and a backrest that laterally has lateral support elements which are supported to be able to be pivotably moved by use of corresponding pivot joints. The pivoting of the support elements is carried out automatically in accordance with an inclination of the backrest, which is brought about by the action of force of a person sitting on the vehicle seat and pressing with his/her back against the backrest. Without the action of force on the backrest, the lateral support elements substantially form a planar face with the backrest. The production of pivot force can be carried out by use of a traction cable which is connected to the backrest and to the lateral support elements. The inclination change of the backrest is accordingly converted into the pivot movement of the lateral support elements.

A similar mechanism for activating an ergonomic support device on a foldable vehicle seat is disclosed in U.S. Pat. No. 7,137,664 B2. A relative pivoting of a seat frame portion with respect to a rear frame portion of the vehicle seat is transmitted by use of a Bowden cable to a pivot movement of pivot flaps which are arranged to be able to be pivotably moved laterally on the seat frame portion. Via the activating pivot movement of the pivot flaps, an increase of the lateral support of lateral cushion portions of a seat cushion which is retained on the seat frame portion is possible. The pivot movement which activates the pivot flap is automatically brought about simply by folding out the vehicle seat and automatically reversed again by folding it in in order to achieve a compact folded-in state of the vehicle seat.

EP 1142751 A1 discloses a vehicle seat with changeable support cushion elements in the outer skin of which piezoelectrically deformable active fibers are provided in order to change the shape of the support cushion elements in accordance with an applied electrical voltage or electrical field.

Two further examples of lumbar supports which can be adapted to a vehicle seat are disclosed in U.S. Pat. Nos. 8,454,090 B2 and 8,439,441 B2.

Although such solutions already provide individual adaptation possibilities of the vehicle seat to a person seated on the vehicle seat, they typically require a relatively costly and complex mechanical construction (for example, pivot, articulation, gear mechanisms, additional seat frame portions, etcetera, with air cushion solutions, furthermore air hoses, pumps, compressed air storage containers and the like), whereby the weight and the production costs of such vehicle seats significantly increase.

It would be desirable to provide a vehicle seat with an adaptable lateral support and a method for adapting the lateral support of a vehicle seat which enables individual adjustment of the lateral support of a person seated on the vehicle seat over a particularly large range from a very small lateral support for a sitting action which is found to be particularly comfortable up to an extremely powerful lateral support for maximum body and vehicle control in the event of particularly sporty travel.

SUMMARY OF THE DISCLOSURE

According to a first aspect of the present disclosure, a vehicle seat having an adaptable lateral support is provided. The vehicle seat includes a seat frame on which a seat cushion and/or a backrest cushion and at least one actuator are retained, wherein the seat cushion and/or the backrest cushion has at least one laterally arranged, resiliently deformable side wall cushion for the lateral support of a person sitting on the vehicle seat and the actuator is operationally connected to the side wall cushion and is configured to apply a deformation force to the side wall cushion for the resilient deformation thereof, and a cable element which connects the side wall cushion to the actuator in a force-transmitting manner so that the actuator introduces the deformation force by tensioning the cable element directly from the cable element into the side wall cushion to deform the side wall cushion to change the lateral support.

According to a second aspect of the present disclosure, a vehicle seat having an adaptable lateral support is provided. The vehicle seat includes a seat frame, a cushion retained on the seat frame, wherein the cushion has at least one laterally arranged, resiliently deformable side wall cushion for the lateral support of a person sitting on the vehicle seat, an actuator operationally connected to the side wall cushion and configured to apply a deformation force to the side wall cushion for the resilient deformation thereof, and a cable element which connects the side wall cushion to the actuator in a force-transmitting manner so that the actuator introduces the deformation force by tensioning the cable element directly from the cable element into the side wall cushion to deform the side wall cushion to change the lateral support.

According to a third aspect of the present disclosure, a method for adapting a lateral support of a vehicle seat is provided. The method includes the steps of applying a deformation force to deform a side wall cushion using an actuator to at least one resiliently deformable, laterally arranged side wall cushion of a seat cushion which is retained on a seat frame and/or a backrest cushion which is retained on the seat frame for the lateral support of a person sitting on the vehicle seat, and tensioning a cable element with the actuator in order to deform the side wall cushion in order to change the lateral support to introduce the deformation force by the actuator directly from the cable element into the side wall cushion via a cable element which connects the side wall cushion in a force-transmitting manner to the actuator.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a perspective view of another embodiment of a vehicle seat in a first operating state with minimum lateral support;

FIG. 4 is a perspective view of the vehicle seat from FIG. 3 in a second operating state with maximum lateral support;

FIG. 5 is a perspective view of yet another embodiment of a vehicle seat in a first operating state with minimum lateral support;

FIG. 6 is a perspective view of the vehicle seat from FIG. 5 in a second operating state with maximum lateral support;

FIG. 7 is a perspective view of an embodiment of a seat frame of the vehicle seat from FIG. 5;

FIG. 8 is a rear view of the vehicle seat from FIG. 6;

FIG. 9 is a perspective view of yet another embodiment of a vehicle seat in a first operating state with minimal lateral support; and FIG. 10 is a perspective view of the vehicle seat from FIG. 9 in a second operating state with maximum lateral support.

DETAILED DESCRIPTION OF THE PREFERRED EMBODIMENTS

Figure 1:
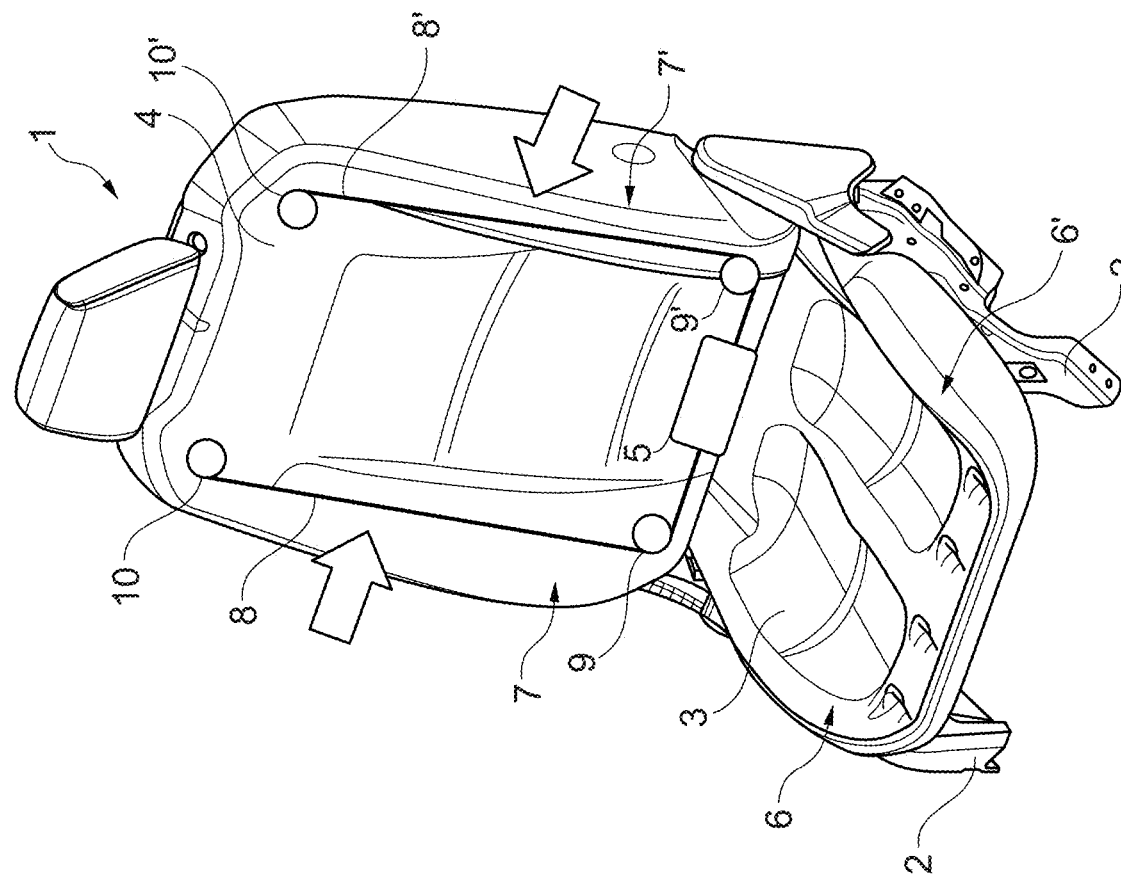
FIG. 1 is a perspective view of an embodiment of a vehicle seat in a first operating state with minimum lateral support.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

In the various figures, components which are equivalent with regard to their function are always given the same reference numerals so that they are generally also only described once.

Figure 2:
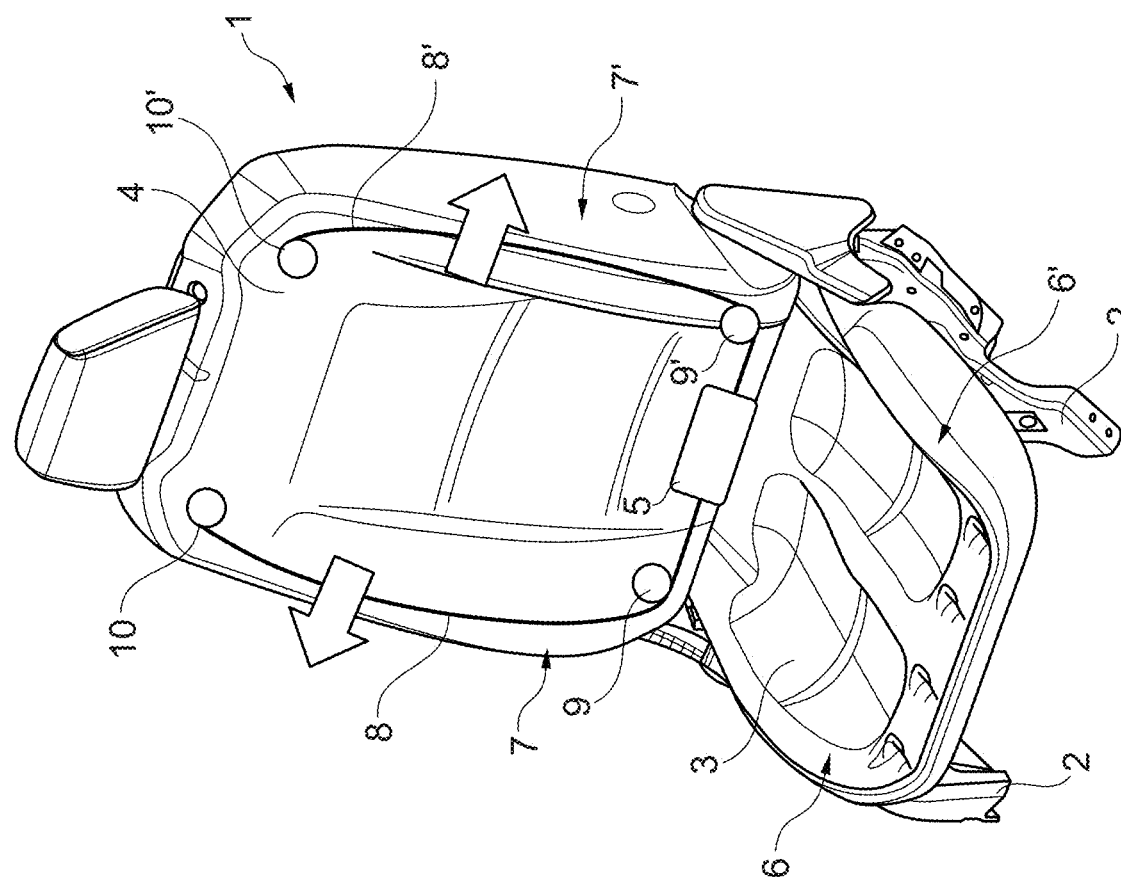
FIG. 2 is a perspective view of the vehicle seat from FIG. 1 in a second operating state with maximum lateral support.

FIG. 1 shows a perspective view of an embodiment of a vehicle seat 1 in an exemplary first operating state with minimum lateral support, while FIG. 2 shows a perspective view of the vehicle seat 1 from FIG. 1 in an exemplary second operating state with maximum lateral support. The vehicle seat 1 has a seat frame 2 (in this instance a metal structure) which can be seen only partially in FIGS. 1 and 2. A more extensive illustration of the seat frame 2 is shown in FIG. 7.

In this instance, a seat cushion 3 and a backrest cushion 4 and an actuator 5 are retained on the seat frame 2, that is to say, securely connected to the metal construction of the seat frame 2. The actuator 5 may, for example, be formed as a piezo actuator, shape-memory alloy (SMA) actuator or as an electromotive actuator, but without being limited thereto. In this instance, the piezo actuator produces an action by using the piezo effect, the shape-memory alloy actuator produces an action by using the effect of shape-memory alloys and the electromotive actuator produces an action by using an electric motor. These actuator effects are well known per se so that they do not need to be discussed here in greater detail.

It can further be seen in FIG. 1 that the vehicle seat 1 has both on the seat cushion 3 and on the backrest cushion 4 two laterally arranged, resiliently deformable side wall cushions 6, 6', 7 and 7' for the lateral support of a person (not illustrated) seated on the vehicle seat 1. The right and left seat wall cushions 6, 6' are in the embodiment shown integral components of the seat cushion 3, the right and left seat wall cushions 7, 7' are in the embodiment of the vehicle seat 1 integral components of the backrest cushion 4.

Furthermore, the actuator 5 of the vehicle seat 1 is connected to both seat wall cushions 7, 7' of the backrest cushion 4 by use of a cable element 8 or 8' (in this instance in the form of a wire cable with a substantially round cross-section) in a force-transmitting manner. In FIG. 1, the cable elements 8, 8' are illustrated in a non-tensioned state which corresponds to the first operating state of the vehicle seat 1. In FIG. 2 the cable elements 8, 8' are illustrated in a tensioned state which corresponds to the second operating state of the vehicle seat 1. The non-tensioned state of the cable elements 8, 8' may be clearly differentiated in FIG. 1 from the tensioned state in FIG. 2 by the curved cable path.

It can further be seen in FIG. 1 that the cable elements 8, 8' between the actuator 5 and the respective side wall cushion 7 or 7' are redirected using a redirection device 9 or 9' which is retained on the seat frame 2 in the form of a redirection roller. Furthermore, each cable element 8, 8' is fixed with an end to respective fixing locations 10, 10' of the seat frame 2, for example, adhesively bonded, clamped, screwed, welded and the like.

It should be understood that the actuator 5 of the vehicle seat 1 is arranged to be remote from a back support face of the backrest cushion 4 facing the viewer of FIG. 1 in order not to negatively influence the seating comfort of the person seated on the seat 1. It should also be understood that the cable elements 8, 8', the redirection devices (e.g., rollers) 9, 9' and the fixing locations 10, 10' for the same reason are not arranged on or close to the surface or back support face of the backrest cushion 4. The illustration of these elements in FIGS. 1 and 2, which is apparently associated with the surface of the backrest cushion, serves exclusively the purpose of easier understanding of the principle of the disclosure. The cable elements 8, 8', the redirection devices 9, 9', the fixing locations 10, 10' and also the actuator 5 may be arranged in a state integrated in the vehicle seat 1, but without being limited thereto.

Starting from the actuator 5, each cable element 8, 8' extends through the respective side wall cushion 7 or 7' and extends through it completely as far as the fixing location 10 or 10', respectively.

In FIG. 1, the large arrows which are directed laterally outward from the seat center indicate that the illustrated first operating state of the vehicle seat 1 with non-tensioned cable elements 8, 8' brings about an automatic free movement of the respective side wall cushions 7, 7' as a result of their resilient deformability into a laterally external initial or rest shape, in which the side wall cushions 7, 7' only provide a small lateral support. This operating state corresponds to a comfort setting of the vehicle seat 1.

In FIG. 2, the large arrows which point from the outer side to the seat center indicate that the illustrated second operating state of the vehicle seat 1 with tensioned cable elements 8, 8' brings about a forced movement of the respective resiliently deformable side wall cushions 7, 7' as a result of the tensile stress applied by the actuator 5 to the cable elements 8, 8' substantially in the transverse direction with respect to the longitudinal extent of the cable elements 8, 8'. The side wall cushions 7, 7' are deformed laterally in the direction toward the seat center by the tensioning movement of the cable elements 8, 8' illustrated by the large arrows so that they provide a considerably higher level of lateral support than in the operating state of FIG. 1. The operating state illustrated in FIG. 2 corresponds to a sport setting of the vehicle seat 1.

Consequently, the deformation state of the side wall cushion 7, 7' in FIG. 2 with cable elements 8, 8' tensioned by the actuator 5 corresponds to a state of higher lateral support compared with the lateral support of the side wall cushion 7, 7' in the force-free original shape of the side wall cushion 7, 7' not influenced by the actuator 5 in FIG. 1.

As can be seen from the operating principle of the disclosure shown in FIG. 1 and FIG. 2, the actuator 5 directs the deformation force for the resilient deformation of the side wall cushion 7, 7' by tensioning the respective cable elements 8, 8' directly from them into the corresponding side wall cushion 7 or 7' in order to deform the side wall cushion 7, 7' in order to change/adapt the lateral support of the vehicle seat 1. Since the cable elements 8, 8' extend substantially completely through the respective side wall cushions 7, 7', the deformation force brought about by the tensile stress of the cable elements 8, 8' in a lateral direction toward the seat center of the vehicle seat 1 is applied to them in a state distributed in a uniform manner over the entire length of the seat wall cushions 7, 7'.

The cable elements 8, 8' can be guided within the respective side wall cushions 7, 7' by guide channels which are not illustrated. The cable elements 8, 8' can also be directly formed, for example, foamed, in the respective side wall cushion 7, 7'.

FIG. 3 shows a perspective view of another embodiment of a vehicle seat 11 in a first operating state with minimum lateral support, while FIG. 4 shows a perspective view of the vehicle seat 11 from FIG. 3 in a second operating state with maximum lateral support.

The significant difference of the vehicle seat 11 with respect to the vehicle seat 1 involves two cable elements 12, 12' also being arranged in the seat cushion 3 in the vehicle seat 11. The cable element 12 is in this instance associated with the side wall cushion 6, the cable element 12' with the side wall cushion 6' of the seat cushion 3. The cable elements 12, 12' are also redirected via a redirection device 9 or 9' and fixed to the seat frame 2 at a fixing location 10, 10' in each case. Consequently, all four side wall cushions 6, 6', 7, 7' of the vehicle seat 11 are connected in a force-transmitting manner by use of an individual cable element 12, 12' or 8, 8' to a single actuator 5 which resiliently deforms the deformation of the respective side wall cushions 6, 6', 7, 7' by acting on the corresponding cable elements 8, 8', 12, 12' with tensile stress in the same manner as described above in relation to the vehicle seat 1.

FIG. 5 shows a perspective view of yet another embodiment of a vehicle seat 13 in a first operating state with minimum lateral support, while FIG. 6 shows a perspective view of the vehicle seat 13 from FIG. 5 in a second operating state with maximum lateral support. In this embodiment, the vehicle seat 13 differs from the vehicle seat 11 substantially only in that the cable elements 12 and 12' in the vehicle seat 13 are activated by a second actuator 5' so that the side wall cushions 8 and 8' of the backrest cushion 4 can be activated independently of the side wall cushions 6 and 6' of the seat cushion 3.

FIG. 7 is a detailed perspective view of an embodiment of the seat frame 2 of the vehicle seat 13 from FIG. 5. The respective arrangement and securing of the two actuators 5, 5, the four redirection devices 9, 9' and the four fixing locations 10, 10' can clearly be seen in this illustration.

FIG. 8 is a rear view of the vehicle seat 13 from FIG. 6. In this illustration, the actuator 5' which is associated with the seat cushion 3 cannot be seen. However, the illustration of FIG. 8 shows yet another difference of the vehicle seat 13 compared with the vehicles seats 1 and 11. The side wall cushions 7, 7' as is also the case with the seat wall cushions 6, 6' in each case have a hard inner wall core 14, 14' and 15, 15' which is surrounded by a softer outer cushion cover of the corresponding seat wall cushions 6, 6', 7, 7'. The respective cable element 8 and 8' and 12 and 12' (not visible) are coupled to the corresponding hard inner wall core 14, 14', 15, 15' in order to introduce the deformation force directly into the hard wall cores 14, 14', 15, 15'.

FIG. 9 shows a perspective view of yet another embodiment of a vehicle seat 16 in a first operating state with minimum lateral support, while FIG. 10 shows a perspective view of the vehicle seat 16 from FIG. 9 in a second operating state with maximum lateral support. The vehicle seat 16 differs from the vehicle seats previously shown in FIGS. 1-8 in that both side wall cushions 7, 7' of the backrest cushion 4 are activated by only a single cable element 17, wherein the cable element 17 forms a continuous, closed cable loop from and back to the actuator 5. In this embodiment, in place of the upper fixing locations 10, 10' in the backrest cushion, two additional redirection elements 9, 9' (in this instance redirection rollers) are provided. In a similar manner, both side wall cushions 6, 6' of the seat cushion 3 in the present embodiment are activated by a single cable element 18, wherein the cable element 18 forms a continuous, closed cable loop from and back to the actuator 5'. In place of the front fixing locations 10, 10' in the seat cushion, two additional redirection devices 9, 9' (in this instance redirection rollers) are also provided in this instance.

The vehicle seat disclosed herein and which has an adaptable lateral support and the method for adapting the lateral support of a vehicle seat are not limited to the embodiments disclosed herein, but instead also comprise other embodiments which function in the same manner and which are derived from other technically advantageous combinations of the features of the vehicle seat or the method described herein. In particular, the features and feature combinations mentioned herein above in the general description and the description of the figures and/or shown alone in the Figures can be used not only in the combinations explicitly set out herein but also in other combinations or alone without departing from the scope of the present disclosure.

In one embodiment, the vehicle seat is used in a vehicle, in particular in a motor vehicle, such as, for example, a passenger vehicle. Accordingly, a motor vehicle having at least one vehicle seat according to one of the embodiments described herein is also disclosed herein.

The vehicle seat and method also enables the weight and the production costs to be as low as possible and enables the vehicle seat to be able to be constructed in a particularly compact manner, which is made possible by use of a relatively simple mechanical construction. The vehicle seat and the method can for the adaptation thereof provide seat properties which are desired for everyday use, up to seat properties which should meet particularly sporty or even motor sport requirements.

It should be appreciated that the features individually set out in the description can be combined with each other in any technically advantageous manner and set out other embodiments of the disclosure. The description additionally characterizes and specifies the vehicle seat and method in particular in connection with the figures.

It should further be noted that a conjunction "and/or" which is used herein and which stands between two features and which connects them to each other is always intended to be interpreted in such a manner that, in a first embodiment of the subject matter according to the disclosure, only the first feature may be present, in a second embodiment only the second feature may be present and, in a third embodiment, both the first and the second feature may be present.

Furthermore, relative terms used herein in the context of the present disclosure relating to a feature, such as, for example, "larger," "smaller," "higher," "lower," "stronger," "weaker" and the like are always intended to be interpreted in such a manner that production-related size deviations of the relevant feature which are within the production tolerances defined for the respective production of the relevant feature are not included by the respective relative term. In other words, according to the definition applicable herein, a size of a feature is intended in the context of the present disclosure to be considered to be "larger," "smaller," "higher," "lower," "stronger," "weaker," and the like, than a size of a comparable feature only when the two sizes compared differ from each other in terms of their value so significantly that this size difference does not safely fall within the production-related tolerance range of the respective feature, but instead is the result of targeted action.

According to the disclosure, a vehicle seat, in particular for a motor vehicle, having an adaptable lateral support has a seat frame, for example, a frame structure in the form of a metal structure on which a seat cushion and/or a backrest cushion and at least one actuator is/are retained. The seat cushion may provide in a manner known per se a seat face for a person sitting on the vehicle seat. The backrest cushion may provide a support face for the upper body, in particular the back, of the person.

An actuator is intended to be understood to be a modular technical drive unit which converts an input variable, for example, an electrical signal, an electrical, magnetic or electromagnetic field, a temperature or a pressure, into mechanical movement. For example, the actuator may be a piezo actuator, a shape-memory alloy (SMA) actuator or an electromotive actuator.

Furthermore, the seat cushion and/or the backrest cushion of the vehicle seat according to the disclosure has/have at least one laterally arranged, resiliently deformable side wall cushion for the lateral support of a person sitting on the vehicle seat. The term "laterally" in the context of the disclosure is intended to be understood to be the arrangement of the side wall cushion on the seat cushion and/or backrest cushion to the right or left of the person seated on the vehicle seat or seat cushion.

Furthermore, the actuator is according to one embodiment of the disclosure operationally connected to the side wall cushion and is configured to apply to the side wall cushion a deformation force which is required for the resilient deformation thereof.

The vehicle seat according to the disclosure has at least one cable element which connects the side wall cushion to the actuator in a force-transmitting manner so that the actuator introduces the deformation force by tensioning the cable element directly from the cable element into the side wall cushion in order to deform the side wall cushion in order to change the lateral support in the desired manner. In other words, the actuator acts by use of the cable tension force thereby produced via the cable element directly on the side wall cushion. The tensile stress of the cable element is accordingly converted directly into the resilient deformation of the side wall cushion. The actuator itself is in this instance not a structural component of the side wall cushion, but is instead arranged to be remote from the side wall cushion and fixed/secured to the seat frame.

The term "cable element" is in the context of the present disclosure intended to be interpreted broadly and may include both a cable per se (that is to say, with a substantially round cross-section) but also a belt, strip and the like (that is to say, flat with a substantially rectangular cross-section). Preferably, only tensile forces from the actuator are transmitted to the side wall cushion with the cable element but without necessarily being limited thereto. The transmission of only a tensile force is, however, already sufficient for the disclosure as a result of the resilient deformability of the side wall cushion since without the tensile force acting via the cable element on the side wall cushion the side wall element automatically deforms back into its initial or resting form again so that for the return deformation of the side wall cushion no additional restoring force has to be applied by the actuator.

The cable element may, for example, be produced from natural fibers or synthetic fibers. The cable element may also be a wire or a steel cable, a fiber-reinforced plastics material cable or strip and the like.

The direct introduction of the deforming force from the cable element to the side wall cushion according to the disclosure makes it possible in a particularly advantageous manner to dispense with additional seat frame components which, for example, driven by the cable element, would be moved (being displaced, pivoted in an articulated manner and the like) in order to move the side wall cushion into another position which changes the lateral support. It is thereby possible with the vehicle seat according to the disclosure not only to save weight, it can further be constructed in a significantly simpler and more compact manner so that both the production costs thereof can be kept low and, in comparison with a conventional vehicle seat, substantially no additional structural space is required. The vehicle seat also enables a significantly more rapid system reaction via the direct chain of effects involving actuator, cable element, side wall cushion compared with, for example, air cushion arrangements.

Nonetheless, the vehicle seat enables a change between a comfortable seating position with only little lateral support which, for example, can be provided by the side wall cushion in its original shape or rest position, up to a particularly sporty seating position with particularly powerful lateral support which, for example, can be produced by the side wall cushion with an activated actuator, that is to say, with maximum tensile stress transmitted via the cable element to the side wall cushion. Particularly the latter seat position is particularly advantageous during sporty travel since it provides a person sitting on the vehicle seat with maximum lateral retention, which considerably improves both the body control and the vehicle control (for a driver of a vehicle). At the same time, the vehicle seat is also extremely highly suitable for everyday use in the comfort setting thereof.

Depending on the arrangement of the at least one cable element in the seat cushion with a side wall cushion and/or in the backrest cushion with a side wall cushion, the variable lateral support can be provided both in a leg region (for example, upper leg) and/or in an upper body/rear region of a person sitting on the vehicle seat.

In a particular embodiment, between the two above-mentioned maximum settings with regard to the lateral support, additional intermediate settings are possible. These can be achieved by tensile stresses of differing intensity being applied by the actuator to the cable element. Since the extent of the deformation of the side wall cushion may behave in a proportional manner to the applied tensile stress and the intensity of the lateral support provided by the side wall cushion also continuously increases with increasing deformation, different intensities of the lateral support provided by the vehicle seat or the side wall cushion can be achieved via the level of the tensile stress actually applied by the actuator. This can optionally be carried out in predetermined stages (tensile stress stages) or be carried out substantially continuously between the two maximum settings (continually adjustable tensile stress). In this manner, a highly individual adaptation of the lateral support to the person seated on the vehicle seat is ensured.

On the cable element and/or on the actuator, for example, a tensile stress measurement device, for example, an expansion measuring strip, for detecting and monitoring the tension force acting on the cable element may be provided.

Consequently, via the tensile stress which is currently introduced into the cable element, a conclusion can be drawn relating to the extent of the side wall deformation of the side wall cushion and ultimately regarding the resulting lateral support. In this manner, a precise adjustment of the lateral support can be controlled in accordance with user-specific and/or application-specific provisions.

According to an advantageous embodiment, the deformation state of the side wall cushion, brought about as a result of the deformation force applied by the actuator to the side wall cushion, corresponds to a state of higher lateral support of the side wall cushion compared with the lateral support of the side wall cushion in a force-free initial or resting form uninfluenced by the actuator. In other words, the lateral support provided by the side wall cushion also increases as the deformation increases. The tensioning of the cable element by the actuator consequently leads substantially to a movement of the cable element in the lateral direction toward the seat center, whereby the side wall element is substantially also pressed in the direction toward the seat center and is deformed, for example, substantially erected or raised. The erection/raising of the side wall cushion ultimately leads to an increased lateral support. Conversely, the decrease of the tensile stress applied by the actuator to the cable element leads to a return deformation of the side wall cushion substantially outwardly in a lateral direction and consequently to a lowering of the side wall cushion, whereby the lateral support provided by the side wall cushion also decreases accordingly.

It should be noted that a transposed method of the lateral support adaptation is also possible, that is to say, the lateral support of the side wall cushion via the tensile stress of the cable element produced by the actuator and the resilient deformation of the side wall cushion produced thereby is reduced in comparison with the original form thereof. In this instance, the side wall cushion could in its force-free original form not influenced by the actuator provide a maximum lateral support and by activating the actuator be laterally deformed in an outward direction by use of the cable element so that the side wall cushion is substantially lowered and the lateral support accordingly decreases. In the inactive (that is to say, tensile-stress-free) state of the actuator, the resiliently deformed side wall element could move back into its original shape again (return deformation substantially in the lateral direction toward the seat center) in order to provide the maximum lateral support again.

Another advantageous embodiment makes provision for a plurality of side wall cushions to be connected by use of a single cable element in a force-transmitting manner to the at least one actuator. For example, a plurality or all of the side wall cushions provided on the vehicle seat can be deformed using only a single actuator in order to adapt the lateral support. It is also conceivable for a plurality of side wall cushions which are associated with the backrest cushion to be able to be deformed using a single actuator and a plurality of side wall cushions which are associated with the seat cushion to be able to be deformed using a single additional actuator so that the lateral support of the backrest cushion and the seat cushion can be adapted independently of each other. In any case, the structure can be simplified by use of the simultaneous actuation or activation of a plurality of side wall cushions using a common actuator and the weight and the structural space requirement can be further reduced. Operating a plurality of side wall cushions by use of a common cable element enables, for example, the overall length of the cable elements which are intended to be laid in the vehicle seat to be reduced.

According to an advantageous alternative embodiment, a plurality of side wall cushions are connected to the at least one actuator in a force-transmitting manner by use of a separate cable element. Also in this embodiment, as explained above, a plurality or also all of the side wall cushions can be deformed by use of only a single actuator. However, a plurality of side wall cushions, for example, those which are associated with the backrest cushion, can also be deformed by a first actuator and additional side wall cushions, for example, those associated with the seat cushion, can be deformed by another, second actuator. A particular advantage of the force-transmitting connection between a single side wall cushion in each case and the actuator involves simpler laying and guiding of the cable elements within the vehicle seat.

In order to further simplify the guiding of the cable element on the vehicle seat, an advantageous development of the seat and method makes provision for the cable element to be redirected between the actuator and the corresponding side wall cushion with at least one redirection device which is retained on the seat frame. It is possible to use as a redirection device, for example, a redirection roller for a particularly low-friction guiding of the cable element or also in a simply constructed manner a redirection pin on which the cable element is guided in a sliding manner. The redirection device, in addition to guiding the cable element as freely as possible on or in the vehicle seat, at the same time enables the active direction of the tensile or deformation force transmitted from the cable element to the side wall cushion to be determined in a desired manner in order, for example, to be able to carry out efficient deformation work on the side wall cushion (that is to say, maximum deformation with given tensile stress in the cable element).

According to another advantageous embodiment, the cable element is fixed at one end to the seat frame, for example, welded, adhesively bonded, screwed, riveted, and the like, to the seat frame. The tensile stress which is intended to be applied to the cable element can be brought about by the actuator by it pulling on the other end of the cable element. The cable element is tensioned between the single-side fixing thereof on the seat frame and the connection at the other side to the actuator.

According to another advantageous embodiment, the cable element forms a continuous, closed cable loop from the actuator and back to the actuator. In this instance, consequently, an end-side fixing of the cable element to the seat frame can be dispensed with. The tensile stress which is intended to be applied to the cable element can then be brought about by the actuator by it pulling on one end of the cable element and retaining the other end of the cable element, or also pulling on the other end of the cable element. Where applicable, a redirection of the cable element on the seat frame by use of one or more redirection use devices is advantageous, as already explained above. The cable loop advantageously enables a plurality of side wall cushions to be connected by use of only a single cable element together with the same actuator in a force-transmitting manner.

Yet another advantageous embodiment makes provision for the cable element to extend through the side wall cushion. In other words, the side wall cushion surrounds the cable element at least partially, and may surround it completely. Consequently, the deformation force of the cable element can be applied and transmitted to the side wall cushion also in a radial direction or transverse direction with respect to the main extent or longitudinal direction. That is to say, a transverse movement of the untensioned cable element when the tensile stress is applied in the longitudinal direction thereof can be used for deformation of the side wall cushion. In this embodiment, the entire cable element portion which is received in or extends through the seat wall cushion can be used for a uniform force distribution or introduction of force into the side wall cushion so that it is primarily not deformed locally, but instead uniformly in a linear or planar manner.

In order to further improve a uniform and effective introduction of force or transmission of force from the cable element into or onto the side wall cushion, yet another advantageous embodiment makes provision for the side wall cushion to have a hard inner wall core which is at least partially surrounded by a softer outer cushion cover, wherein the cable element is coupled to the hard inner wall core in order to introduce the deformation force directly into the hard wall core. The hard wall core may, for example, be a hard foam core (hard foam inlay) or a plastics material core (plastics material inlay). The cable element may be secured to the wall core or may extend through the wall core. In the latter case, the wall core may have a guide channel in which the cable element is received. The cable element may, however, also be formed directly in the wall core, for example, foam-covered by the wall core or directly cast therein. From the wall core, the deformation force introduced via the cable element is transmitted to the softer outer upholstery cover which is consequently deformed in order to adapt the lateral support.

According to another aspect of the disclosure, a method for adapting a lateral support of a vehicle seat is provided in which, for the lateral support of a person sitting on the vehicle seat, a deformation force required to deform the side wall cushion is applied using an actuator to at least one resiliently deformable, laterally arranged side wall cushion of a seat cushion which is retained on a seat frame and/or a backrest cushion which is retained on the seat frame. According to one embodiment, the deformation force is introduced by the actuator directly from the cable element into the side wall cushion via a cable element which connects the side wall cushion in a force-transmitting manner to the actuator by use of tensioning or reducing the tension of the cable element with the actuator in order to deform the side wall cushion in order to change the lateral support.

With regard to method-related term definitions and the actions and advantages of method-related features, extensive reference is made to the disclosure of corresponding definitions, effects and advantages herein in relation to the vehicle seat. That is to say, disclosures herein relating to the vehicle seat should also be used accordingly to define the method, as long as this is not expressly excluded. Disclosures herein relating to the method are also intended to be used accordingly to define the vehicle seat, as long as this is not expressly excluded. In this regard, a repetition of explanations of correspondingly identical features, the effects thereof and advantages of the vehicle seat disclosed herein and the method disclosed herein is largely dispensed with in order to provide a more compact description, without such omissions being intended to be interpreted to be a limitation.

Furthermore, in an advantageous development of the subject-matter of the disclosure, the current tensioning force of the cable element can be determined with a tensile stress measurement device. From the tensioning force which is currently introduced from the cable element into the side wall cushion, a conclusion can be drawn relating to the extent of the side wall deformation thereby brought about and ultimately relating to the resulting lateral support provided. A precise control of different settings of the lateral support in accordance with user-specific and/or application-specific provisions is consequently possible.

For example, different settings may provide a standard setting or normal setting with a lateral support which is achieved with a mean tensile stress of the cable element, furthermore a comfort setting with reduced lateral support by reducing the tension of the cable element, a sport setting with increased lateral support by slightly increasing the tensile stress in the cable element and a race setting with maximum lateral support by completely tensioning the cable element.

The activation of different settings of the lateral support on the vehicle seat can be carried out manually by the user. However, it can in a particularly advantageous manner be carried out automatically, in particular depending on specific travel situations of the vehicle (adaptive adaptation of the lateral support). The adaptive adjustment of the lateral support may, for example, be carried out depending on speed in order to warn a vehicle occupant, in particular a driver, in the event of a very high or excessively high vehicle speed by the driver being made aware of such a travel situation with a significantly more powerful lateral support. The adaptive adjustment of the lateral support can alternatively or additionally also be carried out depending on the location, for example, using global position system (GPS), in order to adapt the lateral support, for example, automatically to travel situations on motorways (comfort setting) or winding roads (sport setting). In particular, prior to travel round a bend, a significant increase of the lateral support can be provided, for example, as a warning signal to the driver in order to make him/her aware that there is a very high travel speed for the approaching bend.

The vehicle seat and the method are consequently advantageously configured to also enable a vehicle interaction with persons seated on the vehicle seat (that is to say, vehicle occupants including the driver) together with other vehicle systems which detect the current vehicle situation, vehicle dynamic, environment situation, etcetera in order to thereby also improve the driving safety in particular.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat having an adaptable lateral support, the vehicle seat comprising:
    a seat frame on which a seat cushion and/or a backrest cushion and at least one actuator are retained, wherein the seat cushion and/or the backrest cushion has at least one laterally arranged, resiliently deformable side wall cushion for the lateral support of a person sitting on the vehicle seat and the actuator is operationally connected to the side wall cushion and is configured to apply a deformation force to the side wall cushion for the resilient deformation thereof; and
    a cable element which connects the side wall cushion to the actuator in a force-transmitting manner so that the actuator introduces the deformation force by tensioning the cable element directly from the cable element into the side wall cushion to deform the side wall cushion to laterally deform the lateral support.

2. The vehicle seat according to claim 1, wherein a deformation state of the side wall cushion, brought about as a result of the deformation force applied by the actuator to the side wall cushion, corresponds to a state of higher lateral support of the side wall cushion compared with the lateral support of the side wall cushion in the force-free initial form uninfluenced by the actuator.

3. The vehicle seat according to claim 1, wherein a plurality of side wall cushions are connected by use of a single cable element in a force-transmitting manner to the at least one actuator.

4. The vehicle seat according to claim 1, wherein a plurality of side wall cushions are connected via separate cable elements in a force transmitting manner to the at least one actuator.

5. The vehicle seat according to claim 2, wherein the cable element is redirected between the actuator and the side wall cushion with at least one redirection device which is retained on the seat frame, and wherein the at least one redirection device directs a length of the cable laterally toward center of the seat.

6. The vehicle seat according to claim 1, wherein the cable element is fixed at one end to the seat frame.

7. The vehicle seat according to claim 1, wherein the cable element forms a continuous, closed cable loop from and back to the actuator.

8. The vehicle seat according to claim 1, wherein the cable element extends through the side wall cushion.

9. The vehicle seat according to claim 1, wherein the side wall cushion has a hard inner wall core which is at least partially surrounded by a softer outer cushion material, wherein the cable element is coupled to the hard inner wall core in order to introduce the deformation force directly into the hard wall core.

10. The vehicle seat according to claim 1, wherein the actuator is a piezo actuator, a shape-memory alloy actuator or an electromotive actuator.

11. A vehicle seat having an adaptable lateral support, the vehicle seat comprising:
    a seat frame;
    a cushion retained on the seat frame, wherein the cushion has at least one laterally arranged, resiliently deformable side wall cushion for the lateral support of a person sitting on the vehicle seat;
    an actuator operationally connected to the side wall cushion and configured to apply a deformation force to the side wall cushion for the resilient deformation thereof; and
    a cable element which connects the side wall cushion to the actuator in a force-transmitting manner so that the actuator introduces the deformation force by tensioning the cable element directly from the cable element into the side wall cushion to deform the side wall cushion to laterally deform the lateral support.

12. A method for adapting a lateral support of a vehicle seat, the method comprising:
    applying a deformation force to deform a side wall cushion using an actuator to at least one resiliently deformable, laterally arranged side wall cushion of a seat cushion which is retained on a seat frame and/or a backrest cushion which is retained on the seat frame for the lateral support of a person sitting on the vehicle seat; and
    tensioning a cable element with the actuator in order to deform the side wall cushion in order to laterally deform the lateral support to introduce the deformation force by the actuator directly from the cable element into the side wall cushion via a cable element which connects the side wall cushion in a force-transmitting manner to the actuator.

13. The method according to claim 12, wherein a deformation state of the side wall cushion, brought about as a result of the deformation force applied by the actuator to the side wall cushion, corresponds to a state of higher lateral support of the side wall cushion compared with the lateral support of the side wall cushion in the force-free initial form uninfluenced by the actuator.

14. The method according to claim 12, wherein a plurality of side wall cushions are connected by use of a single cable element or via separate cable elements in a force-transmitting manner to the at least one actuator.

15. The method according to claim 13, wherein the cable element is redirected between the actuator and the side wall cushion with at least one redirection device which is retained on the seat frame, and wherein the at least one redirection device directs a length of the cable laterally toward center of the seat.

16. The method according to claim 12, wherein the cable element is fixed at one end to the seat frame.

17. The method according to claim 12, wherein the cable element forms a continuous, closed cable loop from and back to the actuator.

18. The method according to claim 12, wherein the cable element extends through the side wall cushion.

19. The method according to claim 12, wherein the side wall cushion has a hard inner wall core which is at least partially surrounded by a softer outer cushion material, wherein the cable element is coupled to the hard inner wall core in order to introduce the deformation force directly into the hard wall core.

20. The method according to claim 12, wherein the actuator is a piezo actuator, a shape-memory alloy actuator or an electromotive actuator.

* * * * *